(12) United States Patent  (10) Patent No.: US 6,721,027 B2
Chuang (45) Date of Patent: Apr. 13, 2004

(54) LIQUID CRYSTAL DISPLAY ON SILICON DEVICE AND ITS FABRICATION METHOD

(75) Inventor: Lisen Chuang, Penghu (TW)

(73) Assignee: Industrial Technology Research Institute, Hsinchu (TW)

( * ) Notice: Subject to any disclaimer, the term of this patent is extended or adjusted under 35 U.S.C. 154(b) by 62 days.

(21) Appl. No.: 09/854,701

(22) Filed: May 12, 2001

(65) Prior Publication Data
US 2002/0097359 A1 Jul. 25, 2002

(30) Foreign Application Priority Data
Jan. 20, 2001 (TW) .................................. 90101504 A

(51) Int. Cl.⁷ ............................................ G02F 1/1343
(52) U.S. Cl. ....................................................... 349/141
(58) Field of Search ................................ 349/141, 142, 349/143, 145, 158, 139, 123; 345/38, 87; 438/30

(56) References Cited

U.S. PATENT DOCUMENTS

| | | | | |
|---|---|---|---|---|
| 5,745,207 A | * | 4/1998 | Asada et al. ............. | 349/141 |
| 6,091,473 A | * | 7/2000 | Hebiguchi ............... | 349/141 |
| 6,157,428 A | * | 12/2000 | Koma ..................... | 349/138 |
| 6,268,617 B1 | * | 7/2001 | Hirakata et al. ......... | 257/72 |
| 6,288,763 B1 | * | 9/2001 | Hirota .................... | 349/141 |
| 6,323,925 B1 | * | 11/2001 | Choi ...................... | 349/124 |
| 6,344,889 B1 | * | 2/2002 | Hasegawa et al. ....... | 349/129 |
| 6,504,592 B1 | * | 1/2003 | Takatori et al. .......... | 349/129 |
| 6,504,594 B2 | * | 1/2003 | Ohe et al. ............... | 349/141 |
| 6,577,368 B1 | * | 6/2003 | Yuh et al. ............... | 349/141 |
| 2001/0005253 A1 | * | 6/2001 | Komatsu ................. | 349/141 |
| 2001/0017607 A1 | * | 8/2001 | Kwon et al. ............. | 345/87 |
| 2001/0046027 A1 | * | 11/2001 | Tai et al. ................. | 349/159 |
| 2003/0011733 A1 | * | 1/2003 | Tsuboi et al. ........... | 349/123 |

* cited by examiner

Primary Examiner—Tarifur R. Chowdhury
Assistant Examiner—Jeanne A. DiGrazio

(57) ABSTRACT

A liquid crystal display is fabricated on a silicon wafer substrate. A pixel electrode layer is formed on the silicon wafer substrate on which driving circuits and active switching elements are fabricated. The pixel electrode layer has a plurality of pixel electrodes with a pixel electrode gap between every two pixel electrodes. After covering the pixel electrode layer with an insulating layer, a common electrode layer is formed. The common electrode layer has a plurality of major common electrodes each formed above a pixel electrode gap. At least one minor common electrode may be interposed between every two major common electrodes. Alignment films are printed above the common electrode layer and on the inner side of an upper glass substrate. A liquid crystal layer filled with negative type liquid crystals is then formed between the silicon wafer substrate and the upper glass substrate.

32 Claims, 15 Drawing Sheets

FIG. 5a frame N
column

|   | 1 | 2 | 3 | 4 | 5 |
|---|---|---|---|---|---|
| 1 | + | + | + | + | + |
| 2 | − | − | − | − | − |
| 3 | + | + | + | + | + |
| 4 | − | − | − | − | − |
| 5 | + | + | + | + | + | line frame N+1
column

|   | 1 | 2 | 3 | 4 | 5 |
|---|---|---|---|---|---|
| 1 | − | − | − | − | − |
| 2 | + | + | + | + | + |
| 3 | − | − | − | − | − |
| 4 | + | + | + | + | + |
| 5 | − | − | − | − | − | line

FIG. 5b frame N

| column / line | 1 | 2 | 3 | 4 | 5 |
|---|---|---|---|---|---|
| 1 | + | − | + | − | + |
| 2 | − | + | − | + | − |
| 3 | + | − | + | − | + |
| 4 | − | + | − | + | − |
| 5 | + | − | + | − | + | frame N+1

| column / line | 1 | 2 | 3 | 4 | 5 |
|---|---|---|---|---|---|
| 1 | − | + | − | + | − |
| 2 | + | − | + | − | + |
| 3 | − | + | − | + | − |
| 4 | + | − | + | − | + |
| 5 | − | + | − | + | − |

FIG. 5c frame N

| column | | | | | |
|---|---|---|---|---|---|
| 5 | + | − | + | − | + |
| 4 | + | − | + | − | + |
| 3 | + | − | + | − | + |
| 2 | + | − | + | − | + |
| 1 | + | − | + | − | + |
|  | 1 | 2 | 3 | 4 | 5 | line frame N+1

| column | | | | | |
|---|---|---|---|---|---|
| 5 | − | + | − | + | − |
| 4 | − | + | − | + | − |
| 3 | − | + | − | + | − |
| 2 | − | + | − | + | − |
| 1 | − | + | − | + | − |
|  | 1 | 2 | 3 | 4 | 5 | line

FIG. 5d

LIQUID CRYSTAL DISPLAY ON SILICON DEVICE AND ITS FABRICATION METHOD

FIELD OF THE INVENTION

The present invention generally relates to a liquid crystal display (LCD) and its fabrication method, and more specifically to a liquid crystal display that can be fabricated on a silicon wafer and its fabrication method.

BACKGROUND OF THE INVENTION

The ever-increasing demand of high quality images with SXGA or UXGA resolution in current display markets brings tough challenges to the liquid crystal display industry since it is necessary to shrink the pixel size and keep a sufficiently high aperture ratio at the same time. In order to meet both requirements, the inter-pixel gap between pixel electrodes must be reduced accordingly. However, when the inter-pixel gap is reduced to a size less than the cell gap, the fringe field between the on-pixel and the adjacent off-pixel will cause a number of undesired effects on the image quality and electro-optical properties of the liquid crystal on silicon (LCoS) devices. For example, it will induce the generation of disclination lines within the on-pixel as a result of the competition between two topologically inequivalent domains. The disclination lines will influence the electro-optical properties of a liquid crystal cell in both normally black (NB) and normally white (NW) cases. In the normally black case, they appear dark within the bright on-pixel and reduce the effective aperture ratio and the reflectance. In the normally white case, however, they degrade the dark state and reduce the contrast ratio.

FIG. 1a shows the calculated reflectance of liquid crystal cells in a conventional vertically aligned liquid crystal display when one pixel is on and the adjacent pixels are off. The horizontal axis represents the pixel position while the vertical axis represents the percentage of the reflectance. The wavelengths of three incident lights are respectively 500 nm, 550 nm and 600 nm. The pixel size is 15 µm. The total width of the image displayed in FIG. 1a is 24 µm which covers three pixels. The width of the center bright on-pixel shown is 15 µm and the width of each adjacent off-pixel plus the inter-pixel gap is 4.5 µm. The electrical voltage applied to both adjacent off-pixels is different from that applied to the center on-pixel. As shown in FIG. 1a, the disclination line appears dark in the bright on-pixel and part of the adjacent off-pixels is turned on.

Similarly, FIG. 1b shows the calculated reflectance of liquid crystal cells in a conventional twisted nematic (TN) liquid crystal display when one pixel is on and the adjacent pixels are off. The pixel size is 15 µm. The total width of the image displayed in FIG. 1b is 30 µm. As shown in FIG. 1b, the disclination line also appears dark in the bright on-pixel and part of the off-pixels is turned on.

Nowadays, the range for the size of the pixel fabricated on the LCoS wafer is as small as 10 to 15 µm and the gap between pixels is about 1 µm. Therefore, the fringe field among pixels is very large. Frame inversion is generally used as a driving method to increase the reflectance. Although this driving method can get higher reflectance, there are disclination lines generated when the voltage difference between two pixels is high. This reduces the reflectance, slows down the response speed and provides a poor image quality.

In a conventional LCoS light valve, a transparent indium-tin-oxide (ITO) and a metal material with high reflectivity, such as aluminum, are used as pixel and common electrodes. Because the work functions of two electrodes are different, it is a common practice to apply a constant dc voltage to the ITO common electrode to compensate for the difference in the work function. However, experimental observations indicate that no single constant dc voltage can eliminate flickers and image sticking across the light valve.

SUMMARY OF THE INVENTION

This invention has been made to overcome the above-mentioned annoying issue of disclination lines caused by the fringe field between the on-pixel and the adjacent off-pixel of a conventional liquid crystal display. The primary object is to provide a liquid crystal display fabricated on a silicon wafer, called LCoS device. Another object of the present invention is to provide a method for manufacturing the LCoS device.

The LCoS device comprises an upper glass substrate, and a lower silicon wafer substrate with driving circuits and active switching elements formed thereon. A layer of pixel electrodes having multiple pixel electrodes is formed on the silicon wafer substrate. The active switching element on the silicon wafer substrate is used to control the voltage applied to the pixel electrodes. An insulation layer is deposited on the layer of pixel electrodes and a common electrode layer is then formed above the insulation layer. The common electrode layer has a plurality of major common electrodes each being formed above the gap between two adjacent pixel electrodes. Two alignment films are printed respectively on the inner side of the upper glass substrate and on the common electrode layer. A liquid crystal layer is filled with negative type liquid crystals between the alignment films.

According to the invention, the common electrode layer may further comprise minor common electrodes equally spaced and interposed between every two adjacent major common electrodes. The particular geometry of common electrodes generates optimized fringe field that is capable of eliminating the annoying issue of disclination lines and keeping high reflectance in the modulated area. In practice, the top of the common electrode layer may or may not be covered with a protecting layer which is made of a high optical transmittance material.

In a preferred embodiment of an LCoS device according to the present invention, both pixel and common electrodes can use the same metal material, such as aluminum. Therefore, both electrodes have the same property and the image quality is improved. Negative type liquid crystal material is used in the invention. Simulation has been performed with varying cell gap, pre-twist angle, and applied voltage by using four driving methods—frame, column, line, and dot inversion. The simulation results on the LCoS device of the invention show that the worst-case performance of reflectance of the on-pixel is quite high with average value over 75% while keeping the off-pixel in a perfect dark state.

BRIEF DESCRIPTION OF THE DRAWINGS

FIG. 5a shows the polarization effect by using frame inversion as the driving method.

FIG. 5b shows the polarization effect by using column inversion as the driving method.

FIG. 5c shows the polarization effect by using dot inversion as the driving method.

FIG. 5d shows the polarization effect by using line inversion as the driving method.

DETAILED DESCRIPTION OF THE INVENTION

Figure 1A:
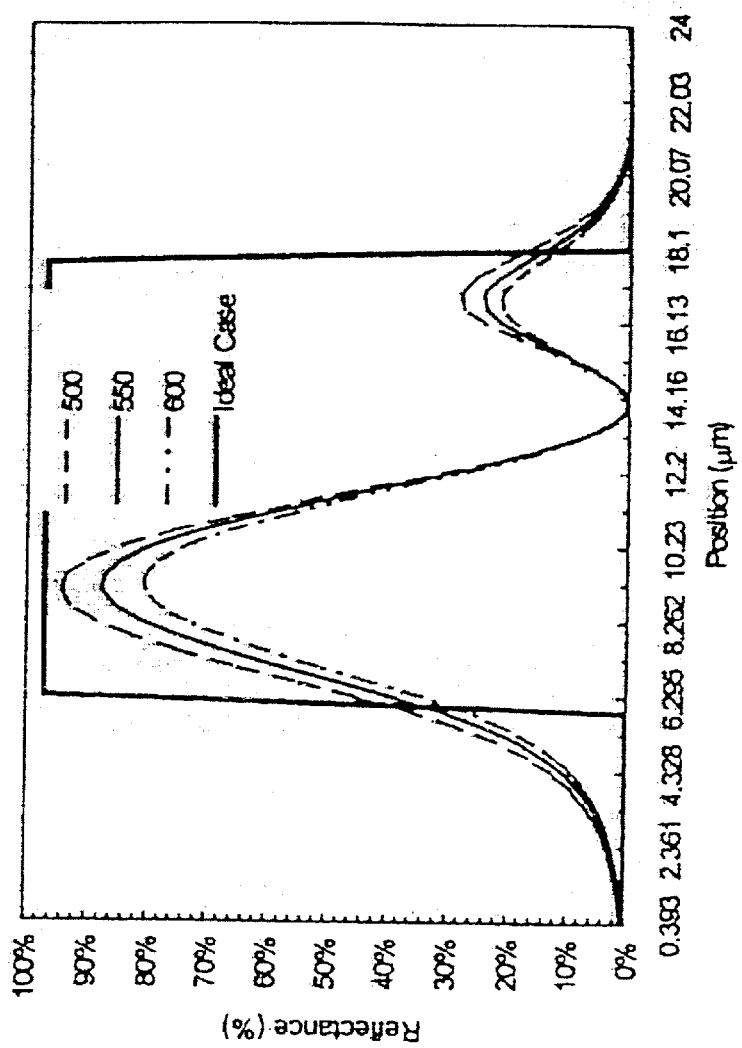
FIG. 1a shows the calculated reflectance of liquid crystal cells in a conventional vertically aligned liquid crystal display when one pixel is on and the adjacent pixels are off.
Figure 1B:
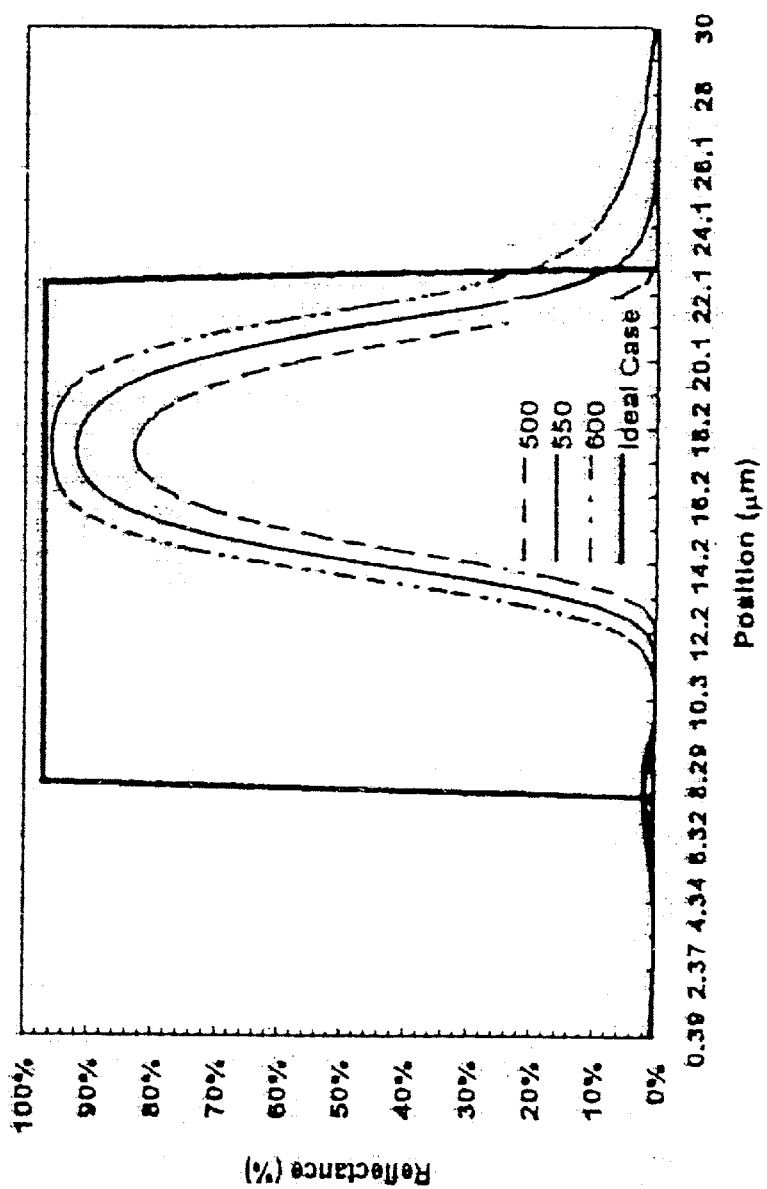
FIG. 1b shows the calculated reflectance of liquid crystal cells in a conventional twisted nematic liquid crystal display when one pixel is on and the adjacent pixels are off.
Figure 2:
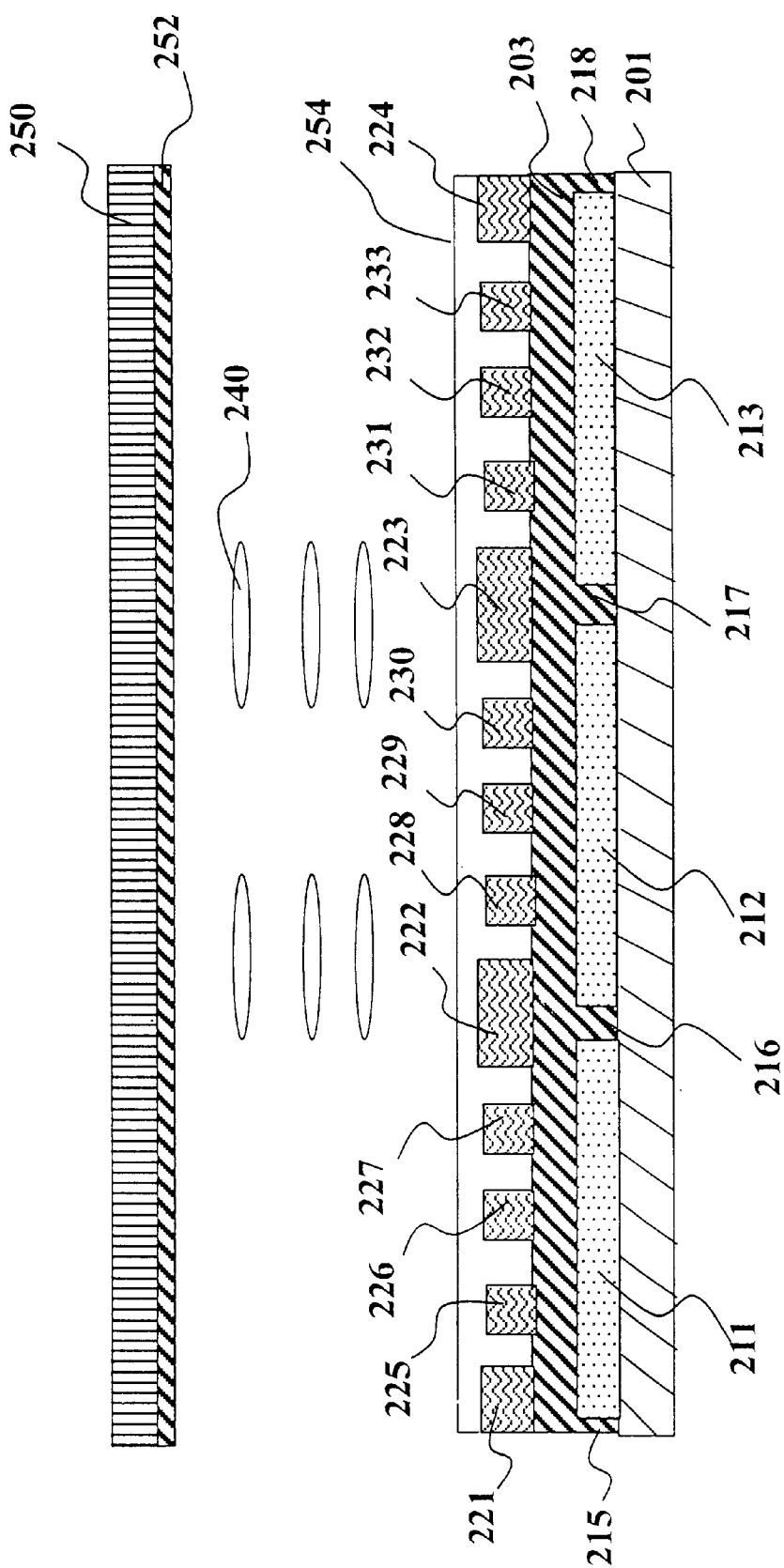
FIG. 2 shows a cross-sectional view of a preferred embodiment of a liquid crystal on silicon (LCoS) device according to the present invention.

FIG. 2 shows a cross-sectional view of a preferred embodiment of a liquid crystal on silicon (LCoS) device according to the present invention. Referring to FIG. 2, the LCoS device comprises an upper glass substrate 250 and a lower silicon wafer substrate 201 with driving circuits and active switching elements being formed thereon (not shown) for controlling applied voltages. A layer of pixel electrodes including multiple pixel electrodes 211–213 is formed on the silicon wafer substrate 201. The active switching element on the silicon wafer substrate is used to control the voltage applied to the pixel electrodes. There is a gap between two adjacent pixel electrodes. An insulation layer 203 is deposited on the layer of pixel electrodes.

Common electrodes 221–233 are formed on the insulation layer 203. Alignment films 252 and 254 are printed respectively on the inner side of the upper glass substrate 250 and on the structure of common electrodes. The space between the alignment films 252 and 254 is filled with negative type liquid crystal material and forms a liquid crystal layer 240. In a preferred embodiment of the invention, the liquid crystal molecules lie horizontally with a small pre-tilt angle ranging from 0° to 8° when no voltages are applied. All liquid crystal molecules have the same aligned orientation. Rubbing process may be applied so that the liquid crystal molecules have the desired initial pre-tilt angle. In practice, chiral dopants may or may not be added to the negative type liquid crystals.

The multiple common electrodes have a particular geometry. As can be seen from FIG. 2, common electrodes 221–224 are formed respectively above the gap between two adjacent pixel electrodes. The common electrode 222 is formed above the gap 216 between pixel electrodes 211 and 212. The common electrode 223 is formed above the gap 217 between pixel electrodes 212 and 213. The common electrode 221 is-formed above the gap 215 between the pixel electrode 211 and its left neighbor pixel electrode (not shown). The common electrode 224 is formed above the gap 218 between the pixel electrode 213 and its right neighbor pixel electrode (not shown).

The common electrode being formed above the gap between two adjacent pixel electrodes is called a major common electrode. Equally spaced common electrodes 225–227 are interposed between the adjacent major common electrodes 221 and 222. Equally spaced common electrodes 228–230 are interposed between the adjacent major common electrodes 222 and 223. Equally spaced common electrodes 231–233 are interposed between the adjacent major common electrodes 223 and 224. The equally spaced common electrodes being interposed between two adjacent major common electrodes are called minor common electrodes. In practice, there may or may not be minor common electrodes. More specifically, there are a major common electrode on the top of each inter-pixel gap and a few equally spaced minor common electrodes interposed between the adjacent major common electrodes.

Figure 3:
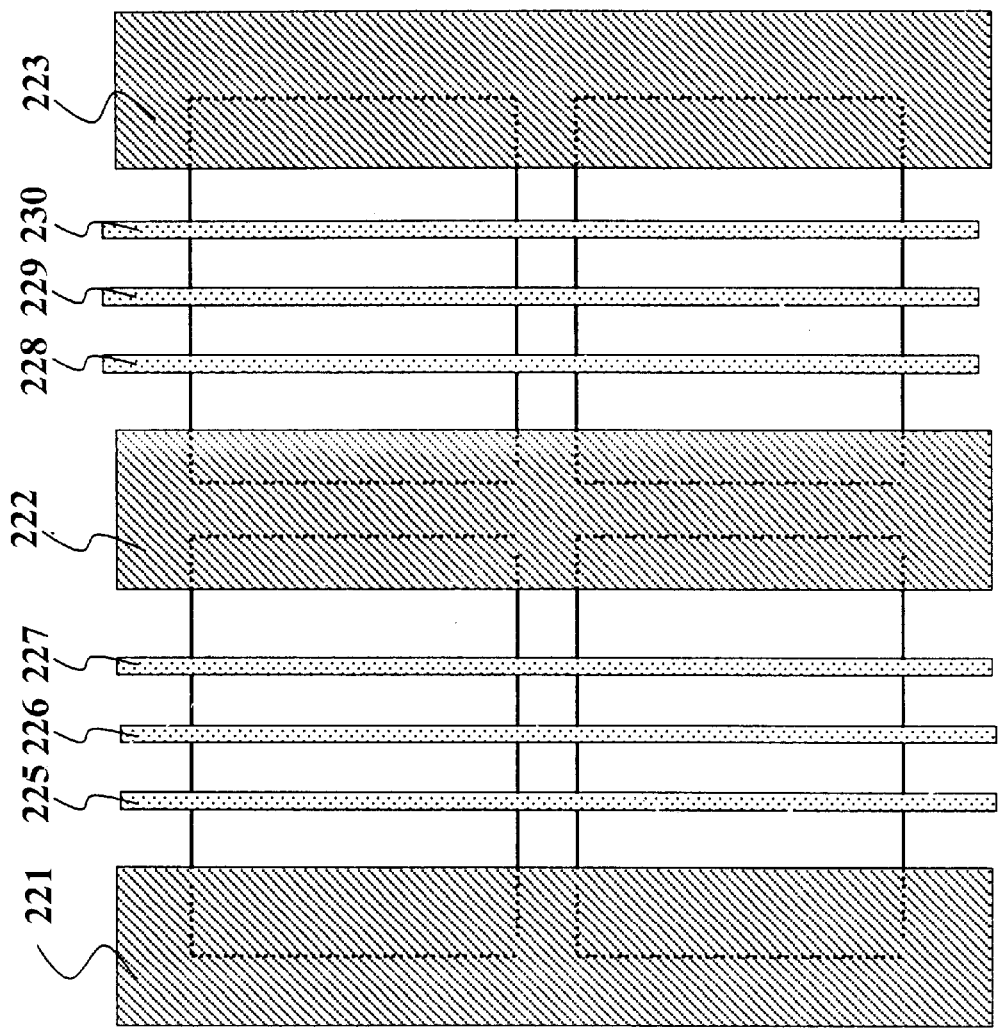
FIG. 3 shows a top view of the particular geometry of the common electrodes shown in FIG. 2.

FIG. 3 shows a top view of the particular geometry of the common electrodes shown in FIG. 2 for a more detailed description. Four rectangles drawn in dotted lines represent four adjacent pixels. The structure composed of major common electrodes 221–223 and minor common electrodes 225–230 is fabricated along the column direction. Common electrodes are parallel. The width of major common electrodes is larger than or equal to that of inter-pixel gaps. The preferred width of inter-pixel gaps is approximately between 0.1 μm to 2 μm. The preferred width of major common electrodes is approximately between 0.1 μm to 6 μm. The preferred width of minor common electrodes is approximately between 0.2 μm to 5 μm. The preferred width between two minor common electrodes is approximately between 0.5 μm to 6 μm.

Figure 4A:
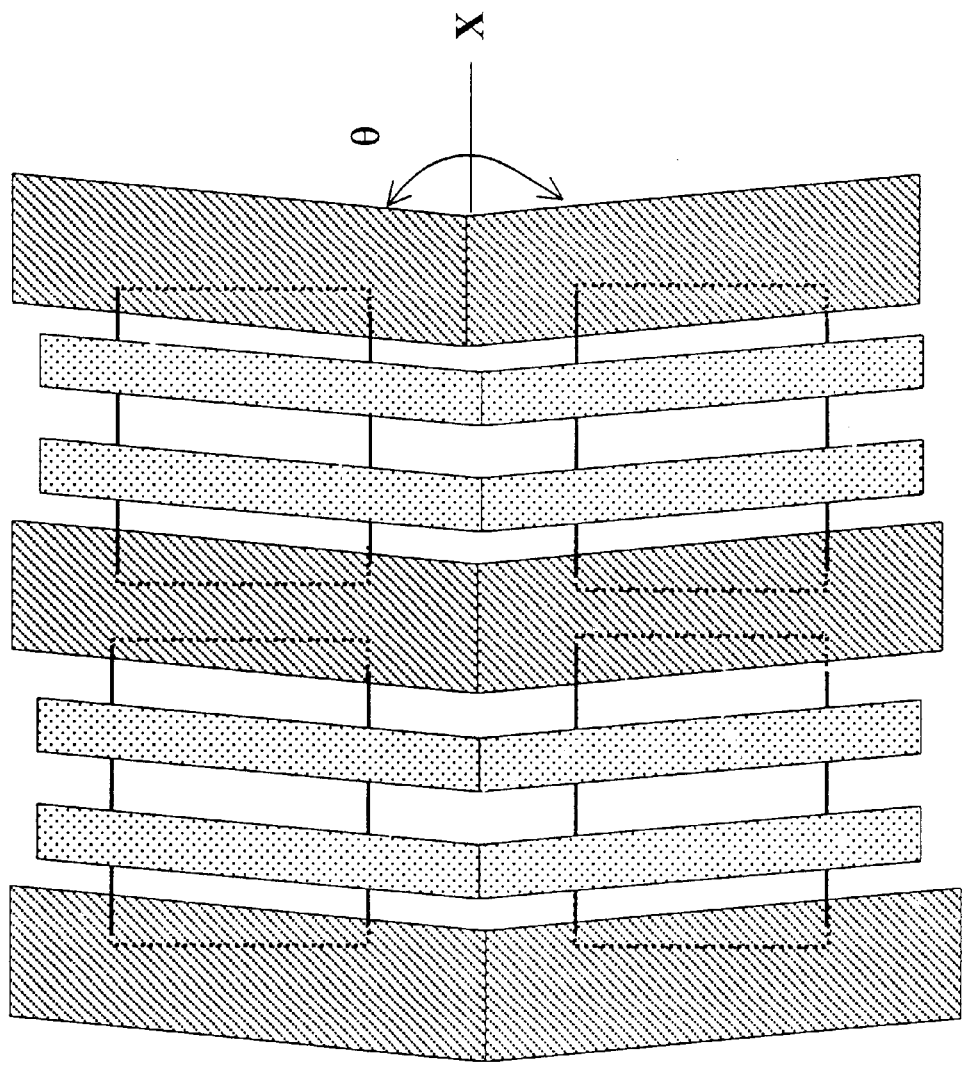
FIG. 4a shows a top view of the common electrodes of herringbone shape according to the present invention.
Figure 4B:
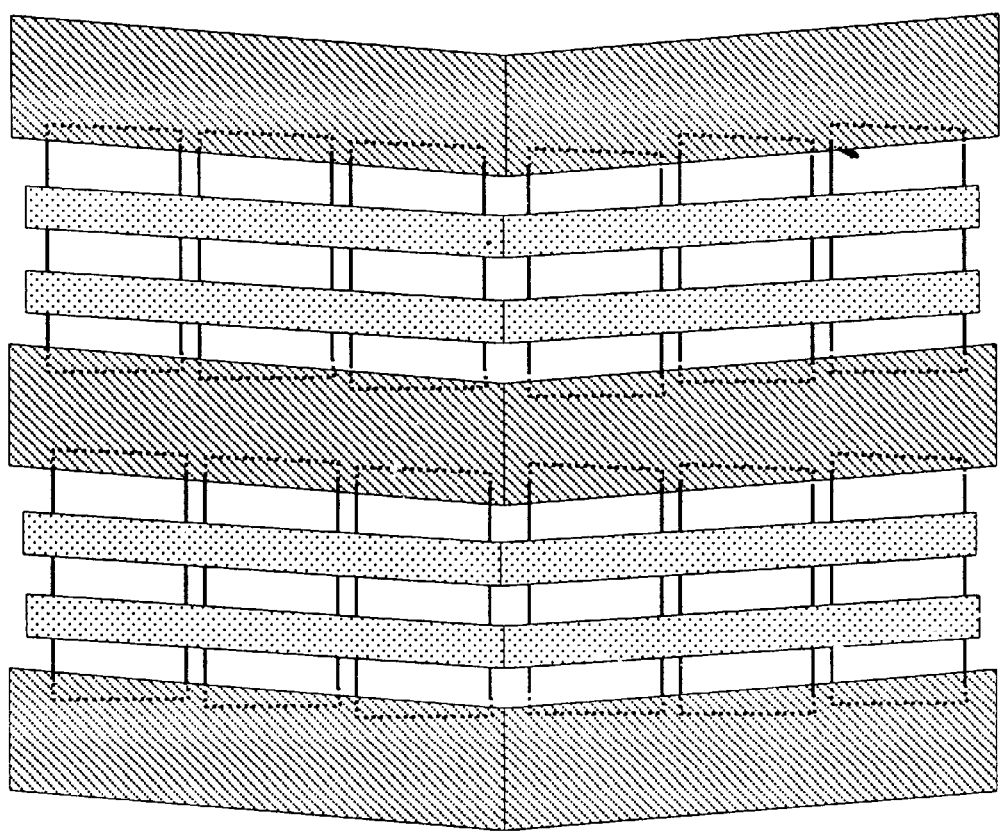
FIG. 4b shows the herringbone-shaped electrodes shown in FIG. 4a with a bend for every three-pixel pitch according to the present invention.

According to the invention, the structure of common electrodes can also be fabricated along the row direction. It should be noted that other geometry or shape designs for the common electrodes are also possible. FIG. 4a shows a top view of the common electrodes of a herringbone shape where the bending angle θ of common electrodes is between 90° and 180° and the horizontal (X) axis represents the rubbing direction of liquid crystals. As shown in FIG. 4a, herringbone-shaped electrodes can be used to fit the polarization direction of light passing through the polarizing beam splitter. In practice, herringbone-shaped electrodes can be designed with a bend across a certain number of pixels. FIG. 4b shows the herringbone-shaped electrodes shown in FIG. 4a with a bend across every three-pixel pitch.

Figure 4C:
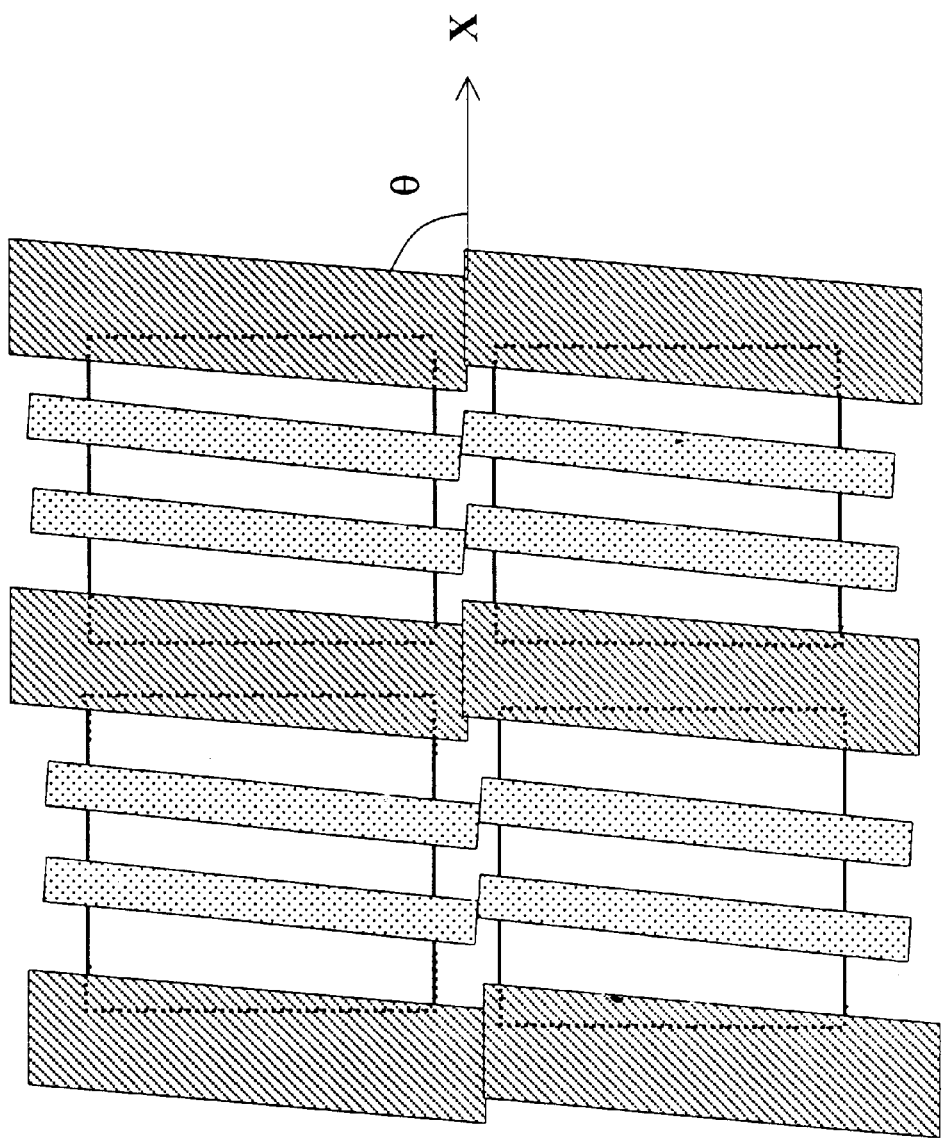
FIG. 4c shows a top view of another geometry of common electrodes of parallelogram shape according to the present invention.
Figure 4D:
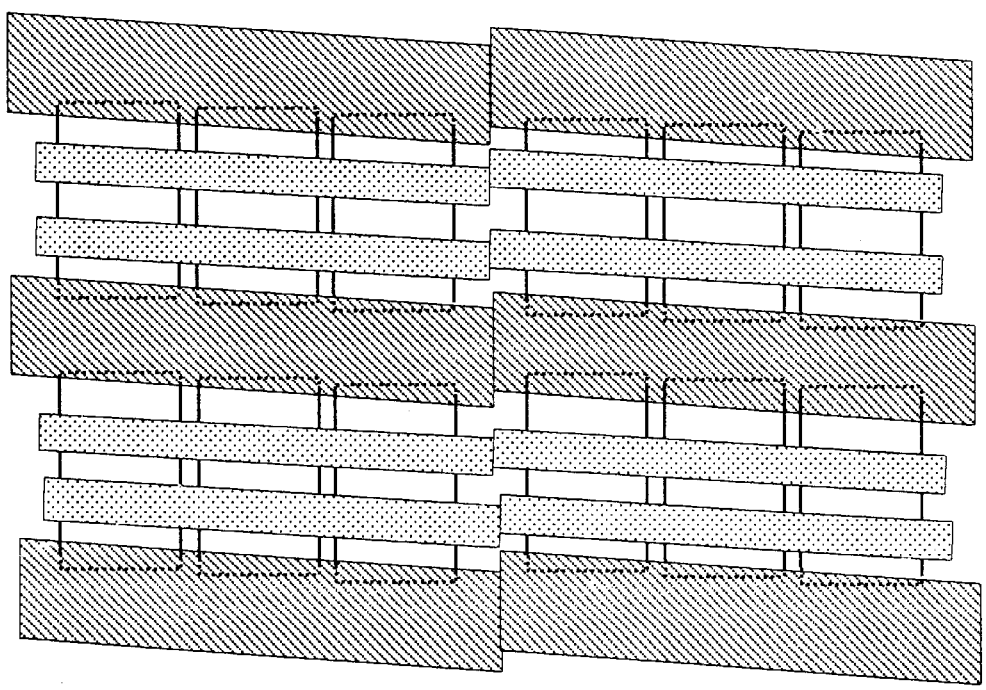
FIG. 4d shows the parallelogram-shaped electrodes shown in FIG. 4c with a slant period for every three-pixel pitch.

FIG. 4c shows a top view of another geometry of common electrodes of a parallelogram shape according to the present invention. As shown in FIG. 4c, the slant angle θ of common electrodes is between 45° and 90° and the horizontal (X) axis represents the rubbing direction of liquid crystals. Similarly, parallelogram-shaped electrodes can be designed to have a slant period for every certain number of pixels. FIG. 4d shows the parallelogram-shaped electrodes shown in FIG. 4c with a slant period for every three-pixel pitch.

According to the simulation result, the particular geometry of common electrodes generates optimized fringe field that is capable of eliminating the annoying issue of disclination lines and keeping high reflectance in the modulated area. Therefore, it can further increase the effective aperture ratio. For an on-pixel and its adjacent off-pixel, the reflectance of the on-pixel is quite high with the off-pixel in a perfect dark state. For two adjacent on-pixels with opposite voltages, the reflectance for both pixels is also quite high.

In a conventional LCoS light valve, a transparent indium-tin-oxide (ITO) and a metal material with high reflectivity, such as aluminum, are used as pixel and common electrodes. Because the work function of the two electrodes is different, it is a common practice to apply a constant dc voltage to an ITO common electrode to compensate for the difference in the work function. However, experimental observations indicate that no single constant dc voltage can eliminate flickers and image sticking across the light valve. In a preferred embodiment of the invention, both pixel and common electrodes can use the same metal material, such as aluminum. Therefore, both electrodes have the same property and the image quality is improved. In practice, the common electrode structure can be manufactured by using a single metal, such as ITO or aluminum.

Figure 5A:
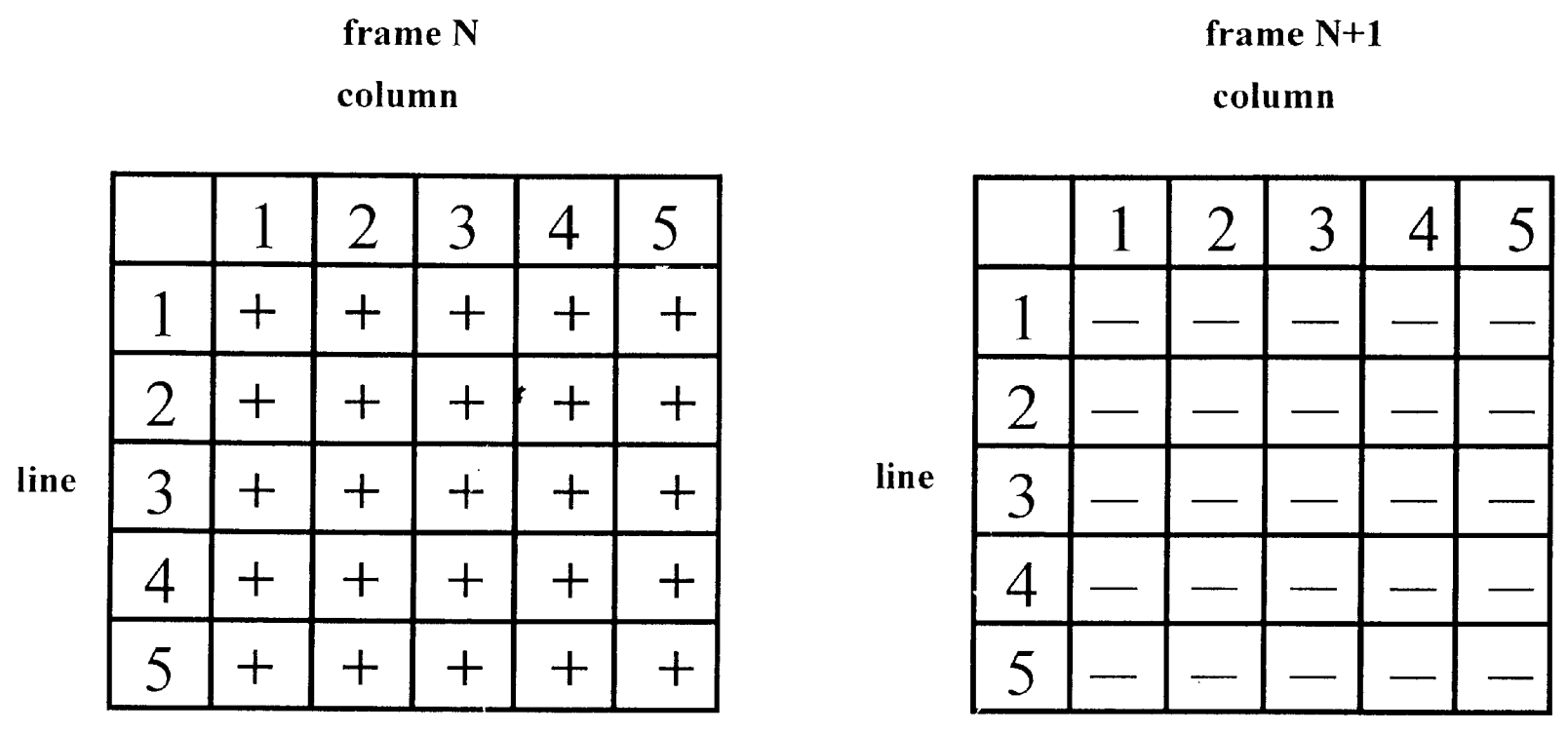

To show the effects of various factors on reflectance, this invention performs the simulation with varying cell gap, pre-twist angle, and applied voltage by using four driving methods—frame, column, line and dot inversion. FIG. 5a shows the polarization effect by using the frame inversion as the driving method. As can be seen, the polarity of every pixel at frame N is positive. At next frame N+1, all pixels are inverted to negative polarity. Frame inversion is simplest among these driving modes. However, it provides the poorest image quality.

FIG. 5b shows the polarization effect by using the column inversion as the driving method. As can be seen, the polarity of every pixel at the same column is the same, and every pixel at the adjacent column has an opposite polarity at frame N. At next frame N+1, the polarity of each pixel is inverted. Column inversion is a common approach to reducing flickers but it does so at the expense of losing light throughput due to the disclination lines generated by the fringe field. As shown in FIG. 5c, every pixel has an opposite polarity to its 4-neighbors under dot inversion driving method and the polarity of each pixel is inverted at next frame. Dot inversion scheme is the most complicated and power consumptive but it produces the best images. However, it has a worst effective aperture ratio under small inter-pixel gaps. FIG. 5d shows the polarization effect using the line inversion driving method. Line or row inversion driving method is similar to column inversion driving method by just changing column to row.

The fabrication process for liquid crystal on silicon (LCoS) devices of the invention is simple and the manufacturing cost is inexpensive too. The fabrication process comprises the following steps. Firstly, a lower silicon wafer substrate 201 is prepared with driving circuits and active switching elements for controlling applied voltages being formed thereon. Then a metal layer is deposited on the silicon wafer substrate 201 and etched to form a plurality of patterns of pixel electrodes 211–213, and the active switching element on the silicon wafer substrate is used to control the voltage applied to the pixel electrodes. The metal layer may comprise any reflective material, such as aluminum or chromium.

After forming the layer of pixel electrodes, an insulation layer 203 is deposited to cover the layer of pixel electrodes. The insulation layer is formed by a transparent and high optical transmittance material, such as silicon nitrogen (SiNx) or silicon oxide (SiOx). Then a layer of common electrodes is deposited on the insulation layer 203 and patterned to form a plurality of common electrode structures where every common electrode structure in a single pixel electrode comprises two major common electrodes, such as 222 and 223, being formed above the gap between two adjacent pixel electrodes, and a plurality of equally spaced minor common electrodes, such as 228–230, being interposed between two adjacent major common electrodes. The material used for the common electrode can be a transparent material, such as ITO, or a non-transparent material, such as the same or different metal being used for the pixel electrode.

After the completion of forming the common electrode structures, an upper glass substrate 250 is prepared and two alignment films 252 and 254 are printed respectively on the inner side of the upper glass substrate 250 and on the structure of common electrodes. Then the upper glass substrate 250 is combined together with the LCoS device. Finally, the space between the alignment films 252 and 254 is filled with liquid crystals 240. According to the invention, the top of the common electrode structures can be covered with a protecting layer, which is made of high optical transmittance material.

Figure 6:
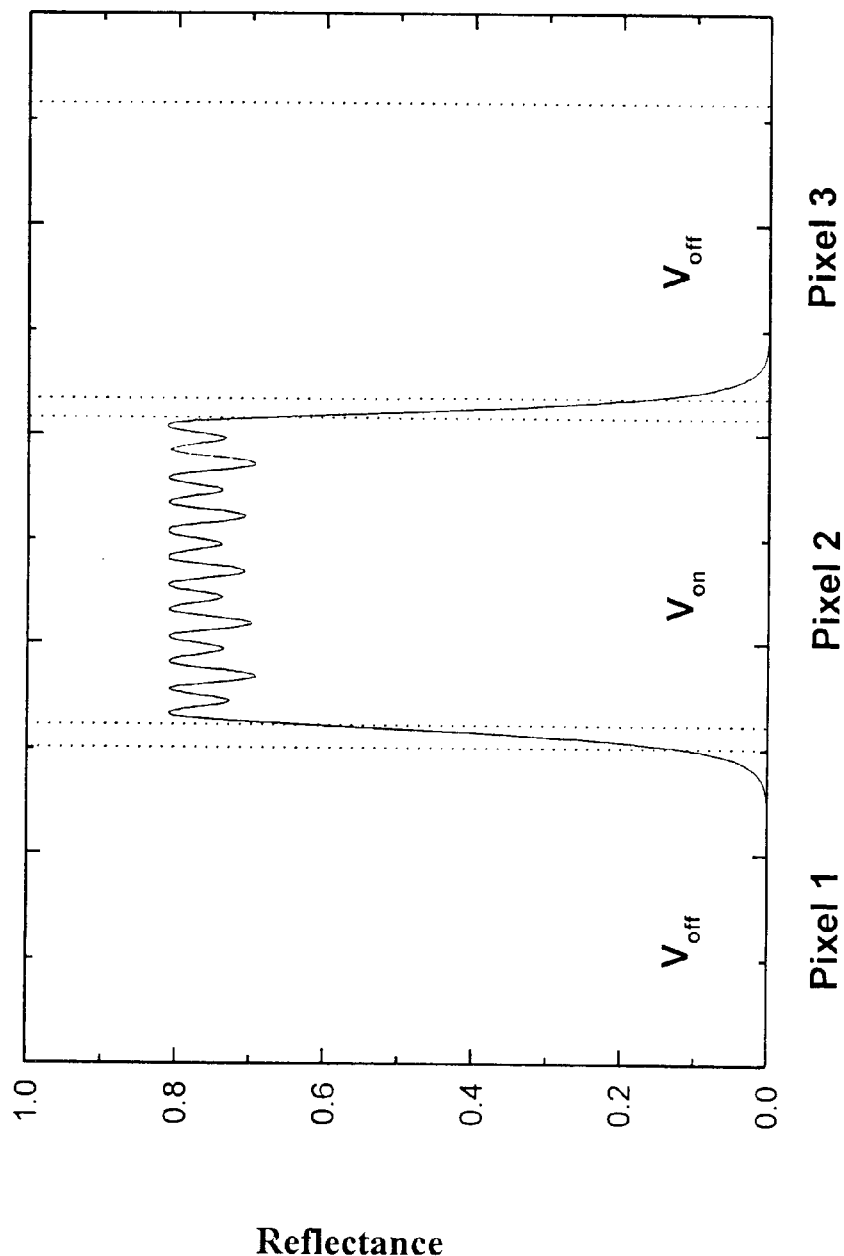
FIG. 6 shows the calculated reflectance as a function of pixel position of the LCoS device of the invention driven by a frame inversion driving scheme.
Figure 7:
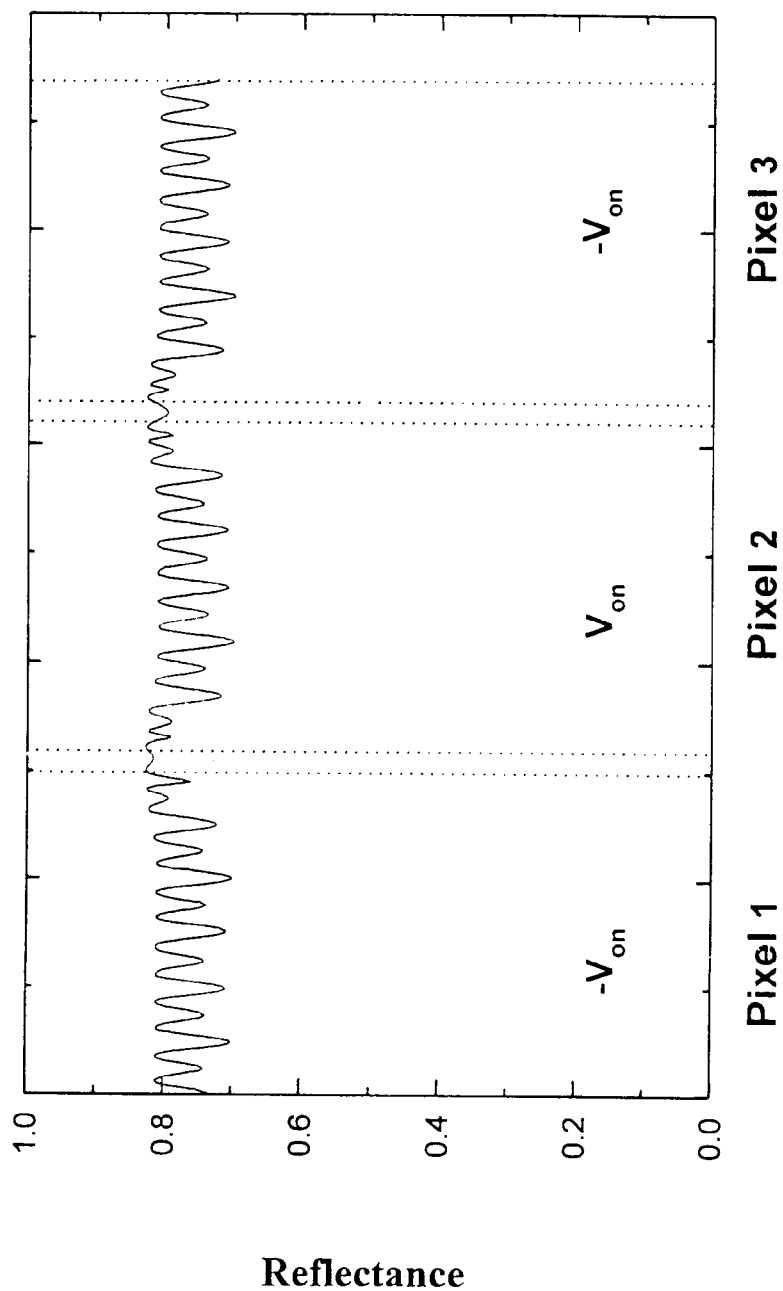
FIG. 7 shows the calculated reflectance as a function of pixel position of the LCoS device of the invention driven by a column inversion driving scheme.

FIG. 6 and FIG. 7 show the calculated reflectance as a function of pixel position of the LCoS device of the invention driven by the frame inversion and the column inversion driving schemes respectively. Extended Jones matrix formulation is used to calculate the reflectance presented in the vertical axis. Referring to FIG. 6, the voltage configuration of pixel 1, pixel 2 and pixel 3 corresponds to the worst case in which a pixel is switched on with the adjacent pixels off, i.e., $V_{off}$, $V_{on}$ and $V_{off}$. From the figure it is obvious that, apart from some irregular fluctuations, the reflectance of the on-pixel is quite high with an average value over 75%. There is also a sharp drop in reflectance across the inter-pixel gap. This is contrary to the situation in other LC modes in which the disclination lines within the bright on-pixel appear dark and, in turn, reduce the effective aperture ratio. In addition, disclination lines also prolong the response time so that a tail of the boundary image appears when an image is moving.

FIG. 7 shows the worst-case performance of reflectance versus pixel position of the LCoS device of the invention by using the column inversion mode. Note that pixel 1 and pixel 3 are at the same voltage as that of pixel 2 but with opposite polarity. Note also that the voltage difference is very large. Therefore, the fringe field among pixels is very large. However, for column inversion operation, the results indicate that the performance of the LCoS device of the invention does not degrade and it still has high reflectance. This is an attractive feature because it shows that this invention can improve the image quality without sacrificing light efficiency.

It is worth mentioning that, if a pixel is switched off while other pixels in consecutive rows are turned on, the fringe field produced by adjacent pixels does not have a vertical field component that twists a negative liquid crystal molecule lying in the row direction. Therefore, the liquid crystal molecules will not be disturbed by the pixels in adjacent rows because they tend to align in directions perpendicular to the fringe field.

Figure 8:
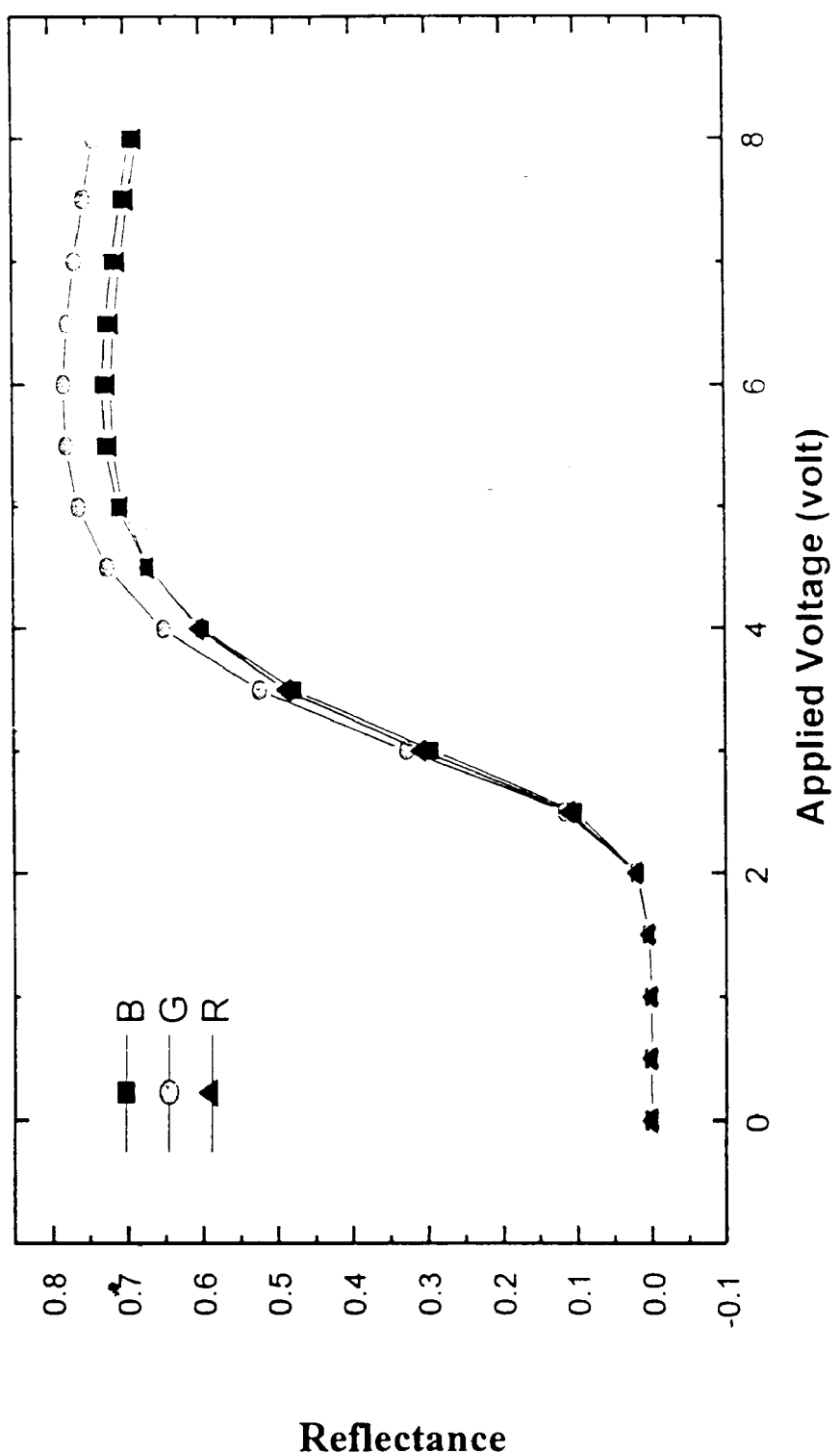
FIG. 8 shows the voltage-reflectance (V-R) curves of the LCoS device with a single cell gap for three incident wavelengths (450, 550 and 650 nm) according to the present invention.

In normally black modes, the contrast ratio decreases as the bandwidth of incident light becomes broader. Therefore, separate (R,G,B) light valves are needed for full-color and high-contrast applications, resulting in the increase of process steps and production cost. Cell gaps tuned to specific wavelengths must be used for each of the three light valves to achieve high reflectance simultaneously, which leads to different switching speed. Since the three color-channels respond to the image data with different speed, the projected image of a moving object of mixed colors exhibits different colors in its leading and trailing edges, resulting in the "blue-leading-edge" problem. This invention has calculated the voltage-reflectance (V-R) curves of the LCoS device with a single cell gap for three incident wavelengths (450, 550 and 650 nm). The simulation results presented in FIG. 8 show that the dispersion in this device is not severe for a single cell gap. This is advantageous from the standpoint of cost reduction because the manufacturing process can be greatly simplified.

This invention uses an LC mode with conventional finger on plane (FOP) type of common electrodes fabricated in a LCoS light valve. The manufacturing process is simple and the manufacturing cost is inexpensive. The particular geometry of common electrodes generates optimized fringe field that is capable of eliminating the annoying issue of disclination lines and keeping high reflectance in the modulated area. Therefore, it can further increase the effective aperture ratio. Both pixel and common electrodes can use the same metal material Therefore, both electrodes have the same property and the image quality is improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A liquid crystal display fabricated on a silicon wafer substrate, comprising:

a silicon wafer substrate having driving circuits and active switching elements formed thereon;

a reflective pixel electrode layer having a plurality of pixel electrodes formed on said silicon wafer substrate with a pixel electrode gap between every two adjacent pixel electrodes, said active switching elements controlling voltages applied to said pixel electrodes;

an insulating layer deposited on said pixel electrode layer;

a common electrode layer formed on said insulating layer, said common electrode layer having a plurality of first common electrodes each being formed above a pixel electrode gap;

an alignment film printed on said common electrode layer;

an upper glass substrate having a lower surface printed with an alignment film; and a homogenously aligned liquid crystal layer filled with negative type liquid crystals between said two alignment films.

2. The liquid crystal display as claimed in claim 1, further comprising a protecting layer deposited above said common electrode layer.

3. The liquid crystal display as claimed in claim 1, said pixel electrode layer and said common electrode layer having a same metal material.

4. The liquid crystal display as claimed in claim 1, said first common electrodes being manufactured in parallel along a row direction.

5. The liquid crystal display as claimed in claim 1, said first common electrodes being manufactured in parallel along a column direction.

6. The liquid crystal display as claimed in claim 1, wherein the width of a first common electrode is larger than or equal to the width of a pixel electrode gap.

7. The liquid crystal display as claimed in claim 1, wherein each of said first common electrodes is strip-shaped.

8. The liquid crystal display as claimed in claim 1, wherein each of said first common electrodes is herringbone-shaped.

9. The liquid crystal display as claimed in claim 8, wherein each of said herringbone-shaped first common electrodes has a bending angle between 90° and 180°.

10. The liquid crystal display as claimed in claim 8, wherein each of said herringbone-shaped first common electrodes has a straight section of at least one pixel.

11. The liquid crystal display as claimed in claim 8, wherein each of said herringbone-shaped first common electrodes has a pattern cycle of at least one pixel.

12. The liquid crystal display as claimed in claim 1, wherein each of said first common electrodes is parallelogram-shaped.

13. The liquid crystal display as claimed in claim 12, wherein the angle between an edge of said first common electrodes and a rubbing direction of liquid crystals is between 45° and 90°.

14. The liquid crystal display as claimed in claim 1, wherein the width of a pixel electrode gap is between 0.1 $\mu$m to 2 $\mu$m.

15. The liquid crystal display as claimed in claim 1, wherein the width of a first common electrode is between 0.1 $\mu$m to 6 $\mu$m.

16. The liquid crystal display as claimed in claim 1, said common electrode layer comprising a metal material.

17. The liquid crystal display as claimed in claim 16, said metal material being an indium tin oxide.

18. The liquid crystal display as claimed in claim 16, said metal material being aluminum.

19. The liquid crystal display as claimed in claim 1, said common electrode layer further comprising at least one second common electrode interposed between every two adjacent first common electrodes.

20. The liquid crystal display as claimed in claim 19, wherein every two adjacent first common electrodes have more than one second common electrode equally spaced between them.

21. The liquid crystal display as claimed in claim 19, wherein the width of a second common electrode is between 0.2 $\mu$m to 5 $\mu$m.

22. The liquid crystal display as claimed in claim 19, wherein the width of the gap between two adjacent second common electrodes is between 0.5 $\mu$m to 6 $\mu$m.

23. The liquid crystal display as claimed in claim 1, said liquid crystal display being driven by a frame inversion driving mode.

24. The liquid crystal display as claimed in claim 1, said liquid crystal display being driven by a column inversion driving mode.

25. The liquid crystal display as claimed in claim 1, said liquid crystal display being driven by a dot inversion driving mode.

26. The liquid crystal display as claimed in claim 1, said liquid crystal display being driven by a line inversion driving mode.

27. The liquid crystal display as claimed in claim 1, wherein chiral dopants are added to said negative type liquid crystals.

28. The liquid crystal display as claimed in claim 1, wherein molecules of said negative type liquid crystals lie horizontally with a small pre-tilt angle ranging from 0° to 8° when no voltage is applied.

29. A method of manufacturing a liquid crystal display, comprising the steps of:

(a) preparing a silicon wafer substrate;

(b) forming driving circuits and active switching elements on said silicon wafer substrate;

(c) forming a reflective pixel electrode layer having a plurality of pixel electrodes on said silicon wafer substrate with a pixel electrode gap between every two adjacent pixel electrodes, said active switching elements controlling voltages applied to said pixel electrodes;

(d) depositing an insulating layer on said pixel electrode layer;

(e) forming a common electrode layer on said insulating layer, said common electrode layer having a plurality of first common electrodes each being formed above a pixel electrode gap;

(f) printing an alignment film on said common electrode layer;

(g) preparing an upper glass substrate having a lower surface printed with an alignment film printed;

(h) positioning said upper glass substrate above said silicon wafer substrate; and (i) forming a liquid crystal layer filled with negative type liquid crystals between said two alignment films.

30. The method of manufacturing a liquid crystal display as claimed in claim 29, further comprising a step of covering said common electrode layer with a protecting layer before said step (e).

31. The method of manufacturing a liquid crystal display as claimed in claim 29, wherein said common electrode layer further comprises at least one second common electrode interposed between every two adjacent first common electrodes.

32. The method of manufacturing a liquid crystal display as claimed in claim 29, wherein every two adjacent first common electrodes have more than one second common electrode equally spaced between them.

* * * * *